P. H. THOMAS.
SYSTEM OF DISTRIBUTION BY VAPOR ELECTRIC CONVERTERS.
APPLICATION FILED JUNE 14, 1907.
1,110,592. Patented Sept. 15, 1914.
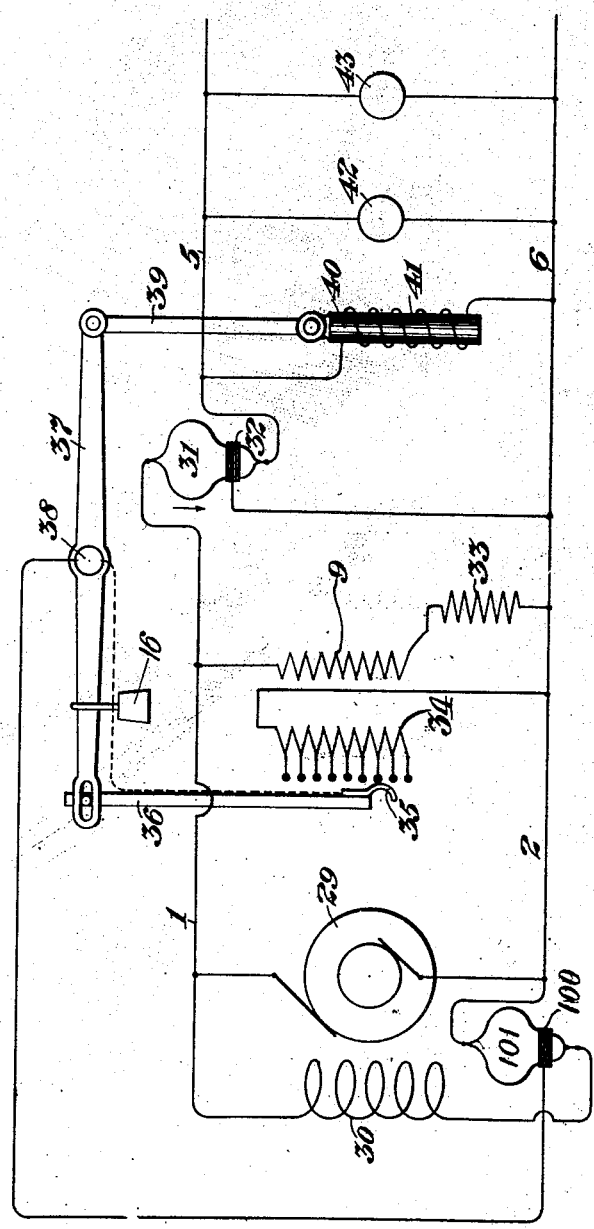
WITNESSES
Chas. F. Clagett
Thos. H. Brown
INVENTOR
Percy H. Thomas
BY
George N. Stocker Jr.
his ATTORNEY

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

SYSTEM OF DISTRIBUTION BY VAPOR ELECTRIC CONVERTERS.

1,110,592. Specification of Letters Patent. Patented Sept. 15, 1914.

Original application filed February 17, 1903. Serial No. 143,760. Divided and application filed June 16, 1905, Serial No. 265,501. Divided and this application filed June 14, 1907. Serial No. 378,896.

*To all whom it may concern:*

Be it known that I, PERCY H. THOMAS, a citizen of the United States, and resident of Montclair, county of Essex, State of New Jersey, have invented certain new and useful Improvements in Systems of Distribution by Vapor Electric Converters, of which the following is a specification.

In another application filed by me on the 17th day of February, 1903, and bearing the Serial Number 142,255, I have shown and described a system of electrical distribution in which means are provided for delivering to a work or consumption circuit, the proper amount of electrical energy for satisfying the momentary needs of the service, such means depending on selecting and utilizing portions of successive cycles which shall be adapted to deliver the desired energy.

The system referred to is adapted to be controlled through the action of current rectifiers which permit the flow of current in one direction and oppose a practically prohibitive resistance to the flow of current in the opposite direction, coupled with devices in the supply circuit for so accelerating the energy derived from the source as to predetermine the time when energy shall begin to traverse the rectifiers.

It should be understood that the apparatus described as a rectifier is characterized by a reluctance to starting which appears particularly at one of the electrodes. When current is applied to the apparatus, an electric strain is produced at the said electrode and by increasing this strain to the breaking point, the apparatus may be started into operation, after which it will continue to operate until the zero point of the wave is reached.

The moment of starting an apparatus of this character can be predetermined by selecting the time when the critical or breaking down strain is applied to the apparatus. The time being selected so as to coincide with a certain portion of a cycle, the energy made use of in the receiving or consumption circuit may be of any desired amount within the capacity of the supply circuit. Should it be desired to deliver to the receiving circuit, for example, a current of low voltage, the starting can be so timed as to utilize the latter part of a cycle or succession of cycles, where the voltage is low, while by a proper adjustment of the controlling devices, the part of the cycle which is utilized may be shifted so as to apply to the receiving circuit the maximum voltage, if desired, or any intermediate voltage.

In the system described and shown in the application referred to, the regulation of the energy delivered to the receiving circuit is voluntarily controlled according to the known needs of such circuit.

By the present invention provision is made for automatically supplying to the receiving circuit an amount of energy corresponding to the load on such circuit, thereby tending to create conditions in the consumption circuit, adapted to the existing needs thereof.

The means by which such automatic regulation is accomplished are illustrated in the accompanying drawing which shows a diagram of a system adapted to accomplish the results named.

In the drawings, 29 represents an alternating current generator, and 30 an exciter therefor. The mains 1 and 2 are here connected with the conductors 5 and 6, through a gas or vapor electric apparatus 31 which serves the purposes of a rectifier, permitting the passage of current in the direction indicated by the arrow, and preventing the discharge of current in the opposite direction under ordinary conditions.

The starting band 32 is connected to the conductor 2, and the primary 9 is here placed in series with a resistance, 33, the primary and the resistance being joined in series between the mains 1 and 2. The secondary, 34, is here provided with variable connections, the movable contact, 35, for accomplishing this being here connected with a link, 36, connected to a lever, 37, pivoted at 38. The opposite end of this lever is connected by a link, 39, with the core, 40, of a coil, 41, connected as a shunt coil between the mains 5 and 6. Translating devices are shown at 42, 43, between the receiving mains 5 and 6. At 101 I show a vapor converter the function of which is to supply the exciter 30 with currents of one direction only. It accomplishes this purpose in view of the negative electrode reluctance at one of the electrodes which permits the flow of current in one direction and suppresses it in another. The starting band serves as a means for breaking down the reluctance of the negative electrode to allow the passage of current in the proper direction. The starting band, 100 is connected through the pivot 38 and the link 36 with the sliding contact 35.

It is, of course, understood that the energy taken through the converter 101 may be taken from the generator during those impulses which are wrongly directed for use in the devices 42 and 43 as is so shown, though by oppositely directing the converter 101 the impulses through the exciter 30 may be taken at the same time as impulses through the converter 31.

The proper operation of the apparatus will be clear from the following: When voltage in the proper direction is impressed by the generator 29 upon the mains 1 and 2, current will flow through the converter 31 in view of the strain introduced upon the negative electrode thereof by the connection of the starting band 32 to the wire 2 and will pass to the wires 5 and 6 and through the various devices connected thereto. When the impulse of the generator 29 is in the opposite direction, no current can pass the converter 31 since no means are provided for breaking down the negative electrode reluctance of the negative electrode under these conditions. The excitation of the generator 29 is secured through the unidirectional impulses passed from the mains 1 and 2 through the converter 101 to the exciter 30 here shown as a field coil. These impulses can pass through the converter 101 in one direction in virtue of the impression of a critical strain on the starting band 100 from the secondary 34 of the transformer primary 9 which is connected through the controlling resistance 33 across the mains 1 and 2. Automatic control of the energy supplied to the mains 5 and 6 from the generator 29 is secured by governing the strength of the excitation in 30 by the shunt coil 41 and coöperating plunger 40. When a definite condition of transmission of energy exists, a certain magnetizing current passes through the resistance 33 to the primary 9 and there excites the secondary 34 which impresses a critical strain upon the starting band 100 of the converter 101 at the desired instant to allow a sufficient quantity of unidirectional current to flow to produce the proper generator voltage. Should a higher voltage be required as, for example, by the dropping of the potential between 5 and 6, the coil 41 will decrease the pull inserted upon the core 40, allowing the counterweight to drop the lever 36 and the movable contact 35 which will include a larger portion of the secondary 34 in the circuit to the starting band 100 and the resulting higher voltage will cause the critical strain upon the starting band 100 to accrue at an earlier time, thus increasing the amount of exciting energy and raising the generator voltage. Similarly with the reverse operation.

These devices can be designed and calibrated, as before, to cause just enough vibration of the secondary 34 to secure the proper acceleration or retardation of the electromotive forces in the supply circuit to compensate for changes in the load of the receiving circuit.

In further explanation it may be stated that an electrode reluctance is set up whenever current is applied in a given direction to an apparatus of this sort, and current will not pass through the apparatus until this reluctance has been broken down. In the present instance, this reluctance appears alternately at the two electrodes, and is alternately broken down by means hereinafter to be described. This breaking down takes place through the action of auxiliary electrical energy added to the electric strain which is produced at each electrode when current is applied to the terminals or electrodes of the apparatus.

Not only do the means about to be described provide for the alternate breaking down of the electrode reluctances, but they also bring it about that the time at which the critical or breaking down strain shall be applied to each electrode may be predetermined. This being the case, only such portions of each cycle as follow the starting point of the cycle will be applied to the consumption circuit and these only until the zero point of the wave is reached.

The average energy delivered to the receiving circuit depends upon the portions of the cycles of the supply actually utilized. This portion may be determined by the relative point in the cycle at which energy is first allowed to traverse the vapor device. On account of the nature of this device current flow is initiated at the instant the strain introduced by starting bands exceeds the critical amount. This time may be varied by increasing the natural maximum voltage of the secondary windings so that the critical strain is reached at an earlier point of every cycle.

Assuming that a satisfactory condition of operation has been reached and beginning with the commencement of some cycle there will be applied from wires 1 and 2 across the work circuit and the device 31 gradually an electric pressure which will, in general be insufficient to overcome the negative electrode reluctance thereof so that no current passes therethrough in the initial stages, but with the increasing voltage, this reluctance is more nearly overcome as the alternation proceeds. At the same time current is passing through the resistance 33 and the transformer primary 9 due to the voltage upon the wires 1 and 2 which in turn causes a strain to be applied to the starting band 100 from the transformer secondary 34. When now this strain becomes sufficient, for example, when one-third of the alternation has passed, the negative electrode reluctance of the negative electrodes will be overcome and current will flow. This current flow will continue in virtue of the characteristics of the negative electrode until the current drops nearly or quite to zero when the negative electrode reluctance of the negative electrode will reëstablish itself. As now voltage rises in the next alternation in the opposite direction, no current will flow through the device, 101, since the other electrode has no starting band or equivalent. Each alternation will then be a repetition of one of the two just described and energy will be impressed steadily upon the work circuit from the mains in a definite quantity.

Supposing now that more energy is used in the supply circuit, as a dropping of the potential between the wires 5 and 6 which will result from a change in the demands, for example, of the device 42, the coil 41 being excited by this potential will be reduced in its attraction on the core 40 which will allow the counterweight 16 to pull the contact down, increasing the effective potential in the starting band 100.

This application is a division of applicant's Patent No. 877,258, January 21st, 1908, which is a division of applicant's case Serial Number 143,760, filed February 17th, 1903.

I claim as my invention—

1. In a system of electrical distribution in which a receiving circuit is fed from an alternating current supply, the combination with a vapor electric device requiring a reinforced potential to start current flow, of means for applying such reinforced potential to said device and means for varying the time of application of said reinforced potential, together with means responsive to the delivered energy for controlling said varying means, said means for applying reinforced potential including a transformer with a variable ratio.

2. In a system of electrical distribution in which a work circuit is supplied from an alternating current source, the combination with a generator in which the control of the delivered energy is obtained through variation of the field excitation and an exhausted electric device controlling the supply of energy to said field excitation, said device requiring a reinforced potential for starting, of means for varying the time of application of said reinforced potential, together with means for controlling said variation in response to the load energy.

3. In a system of electrical distribution in which a receiving circuit is fed from an alternating current supply, the combination with a generator including a direct current field coil and an exhausted electric device adapted to supply impulses of direct current to said field coil from said generator, said device requiring a reinforced potential in starting, of means for utilizing the energy of the generator for reinforcing the potential on the said device at a suitable time in each cycle of the supply.

4. In a system of electrical distribution in which a receiving circuit is fed from an alternating current supply, the combination with a generator including a direct current field coil and an exhausted electric device adapted to supply impulses of direct current to said field coil from said generator, said device requiring a reinforced potential in starting, of means for utilizing the energy of the generator for reinforcing the potential on the said device at a suitable time in each cycle of the supply, said means including a static transformer.

5. In a system of electrical distribution in which a receiving circuit is fed from an alternating current supply, the combination with a generator including a direct current field coil and an exhausted electric device adapted to supply impulses of direct current to said field coil from said generator, said device requiring a reinforced potential in starting, of means for utilizing the energy of the generator for reinforcing the potential on the said device at a suitable time in each cycle of the supply, together with means responsive to energy in the receiving circuit for varying the time of application of said reinforced potential.

6. In a system of electrical distribution in which a receiving circuit is fed from an alternating current supply, the combination with a generator including a direct current field coil and an exhausted electric device adapted to supply impulses of direct current to said field coil from said generator, said device requiring a reinforced potential in starting, of means for utilizing the energy of the generator for reinforcing the potential on the said device at a suitable time in each cycle of the supply, together with electro-magnetic means responsive to energy in the receiving circuit for varying the time of application of said reinforced potential.

7. In a system of electrical distribution in which a receiving circuit is fed from an alternating current supply, the combination with a generator including a direct current field coil and an exhausted electric device adapted to supply impulses of direct current to said field coil from said generator, said device requiring a reinforced potential in starting, of means for utilizing the energy of the generator for reinforcing the potential on the said device at a suitable time in each cycle of the supply, together with means responsive to the potential of the receiving circuit for varying the time of application of said reinforced potential.

8. The combination with an alternating current generator, a work circuit, and a direct current field coil for the said generator, of a vacuum electric rectifier including a completely exhausted container and a vaporizable cathode therein connected in the circuit of said direct current field coil whereby only favorably directed impulses pass from the supply to the said field coil, together with means responsive to the electrical conditions in the work circuit for utilizing a suitable portion only of the favorably directed supply alternations.

Signed at New York, in the county of New York, and State of New York, this 13th day of June A. D. 1907.

PERCY H. THOMAS.

Witnesses:
 WM. H. CAPEL,
 THOS. H. BROWN.